United States Patent [19]
Daniele

[11] Patent Number: 5,444,779
[45] Date of Patent: Aug. 22, 1995

[54] ELECTRONIC COPYRIGHT ROYALTY ACCOUNTING SYSTEM USING GLYPHS

[75] Inventor: Joseph J. Daniele, Pittsford, N.Y.

[73] Assignee: Xerox Corporation, Stamford, Conn.

[21] Appl. No.: 282,389

[22] Filed: Jul. 29, 1994

Related U.S. Application Data

[63] Continuation of Ser. No. 136,842, Oct. 18, 1993, abandoned.

[51] Int. Cl.⁶ ............................................. H04L 9/00
[52] U.S. Cl. .......................................... 380/3; 380/18; 380/23; 380/51; 380/55; 358/462; 358/468; 358/470; 382/112; 355/201
[58] Field of Search ............... 358/406, 462, 468, 470; 382/34; 355/201; 340/825.31, 825.34; 380/3, 4, 18, 23, 49, 50, 51, 55

[56] References Cited

U.S. PATENT DOCUMENTS

| | | | |
|---|---|---|---|
| 4,173,408 | 11/1979 | Stewart | 355/202 |
| 4,179,212 | 12/1979 | Lahr | 355/202 |
| 4,728,984 | 3/1988 | Daniele | 358/300 |
| 4,786,940 | 11/1988 | Daniele | 346/160 |
| 4,908,873 | 3/1990 | Philibert et al. | 382/34 |
| 4,977,594 | 12/1990 | Shear | 380/4 |
| 5,214,696 | 5/1993 | Keiser, II et al. | 380/4 |
| 5,231,663 | 7/1993 | Earl et al. | 380/23 X |
| 5,299,026 | 3/1994 | Vincett et al. | 358/401 |

FOREIGN PATENT DOCUMENTS

| | | | |
|---|---|---|---|
| 3482589 | 11/1989 | Australia | G03G 21/00 |
| 0459792 | 12/1991 | European Pat. Off. | G06K 17/00 |
| 0419226 | 3/1991 | Germany | G03G 21/00 |
| 9301550 | 1/1993 | WIPO | G06F 11/34 |

OTHER PUBLICATIONS

G. Griswold, "A Method for Protecting Copyright on Networks," presented at *Joint Harvard MIT Workshop on Technological Strategies for Protecting Intellectual Property in the Networked Multimedia Environment*, Apr. 3, 1993.

Xerox Disclosure Journal, vol. 4, No. 1, (Jan./Feb. 1979), publication by Hickey: *Copyright Accounting System*.

Copyright Clearance Center brochure, entitled *Creating Copyright Solutions*, distributed by Copyright Clearance Center, Salem, Mass. (no date).

G. Jacobson, "Getting good idea accepted harder than dreaming it up," *The Dallas Morning News*, Jun. 19, 1994.

J. Holusha, "Smart Paper Documents For the Electronic Age," *The New York Times*, Sunday, Jul. 10, 1994, p. F9.

Abstract of German Patent Document 3247115 in English; Derwent; no date given.

*Primary Examiner*—Bernarr E. Gregory
*Attorney, Agent, or Firm*—Duane C. Basch

[57] ABSTRACT

The present invention is a system for utilizing a printable, yet unobtrusive glyph or similar two-dimensionally encoded mark to identify copyrighted documents. Upon attempting to reproduce such a document, the glyph is detected, decoded and used to accurately collect and/or record a copyright royalty for the reproduction of the document, or to prevent such reproduction. Furthermore, the glyph may also include additional information so as to enable an electronic copyright royalty accounting system, capable of interpreting the encoded information, to track and/or account for copyright royalties which accrue during reproduction of all or portions of the original document.

42 Claims, 6 Drawing Sheets

FIG. 8

ELECTRONIC COPYRIGHT ROYALTY ACCOUNTING SYSTEM USING GLYPHS

This is a continuation of application Ser. No. 08/136,842, filed Oct. 18, 1993, now abandoned.

BACKGROUND AND SUMMARY OF THE INVENTION

This invention relates generally to a method and apparatus for detecting the copying of a document protected by a copyright on a reprographic device, and more particularly to the automatic collection and/or recording of copyright royalty fee information based upon encoded copyright information recorded on the copyrighted document.

Reprographic devices (by which is meant devices intended for the convenient reproduction in hardcopy form of documents, whether said documents are in paper, other hardcopy, or electronic form prior to said reproduction, including photocopiers, electronic printers, digital copiers, telecopiers, spirit duplicators, and the like) are used to reproduce all types of documents, including documents that should not be reproduced, or whose reproduction should be limited, tracked or controlled. One common example of a potential abuse of reprographic devices is the copying or reprinting of materials subject to copyright. Recently, many governments have updated copyright laws, and worldwide efforts have been underway to develop a means by which authors and publishers can be fairly recompensed for such copying. Non-profit national collectives, for example the Copyright Clearance Center in the United States, usually referred to as Reproduction Rights Organizations (RRO's), implement copyright licensing systems and convey royalties to the authors and publishers. The RRO's derive their authority from national legislation, contracts with the authors and publishers, and bilateral agreements with other RRO's.

Generally, an RRO pursues the licensing of specific organizations, for example, schools, governments, and private enterprise. In some cases the RRO may grant permission, on a case-by-case basis, for copying particular jobs in return for a specific fee. As an alternative to this transaction-based system, the RRO may grant a blanket license. In a typical blanket license, an organization agrees to pay royalties to the RRO for the reproduction of copyrighted materials over a specified number of years, where the royalty is based upon a sampled survey of the licensee's copier usage.

The licensee pays the RRO a fixed per copy fee for estimated copyright copies for the duration of the license. Paying such fees is often preferable to the licensee than buying the publications or continuing to make illegal copies. Of course, while such schemes are commonly applied to photocopying, they could apply to materials reproduced by other reprographic means, such as electronic printing, digital copying, facsimile transmission (telecopying), etc.

Figure 1:
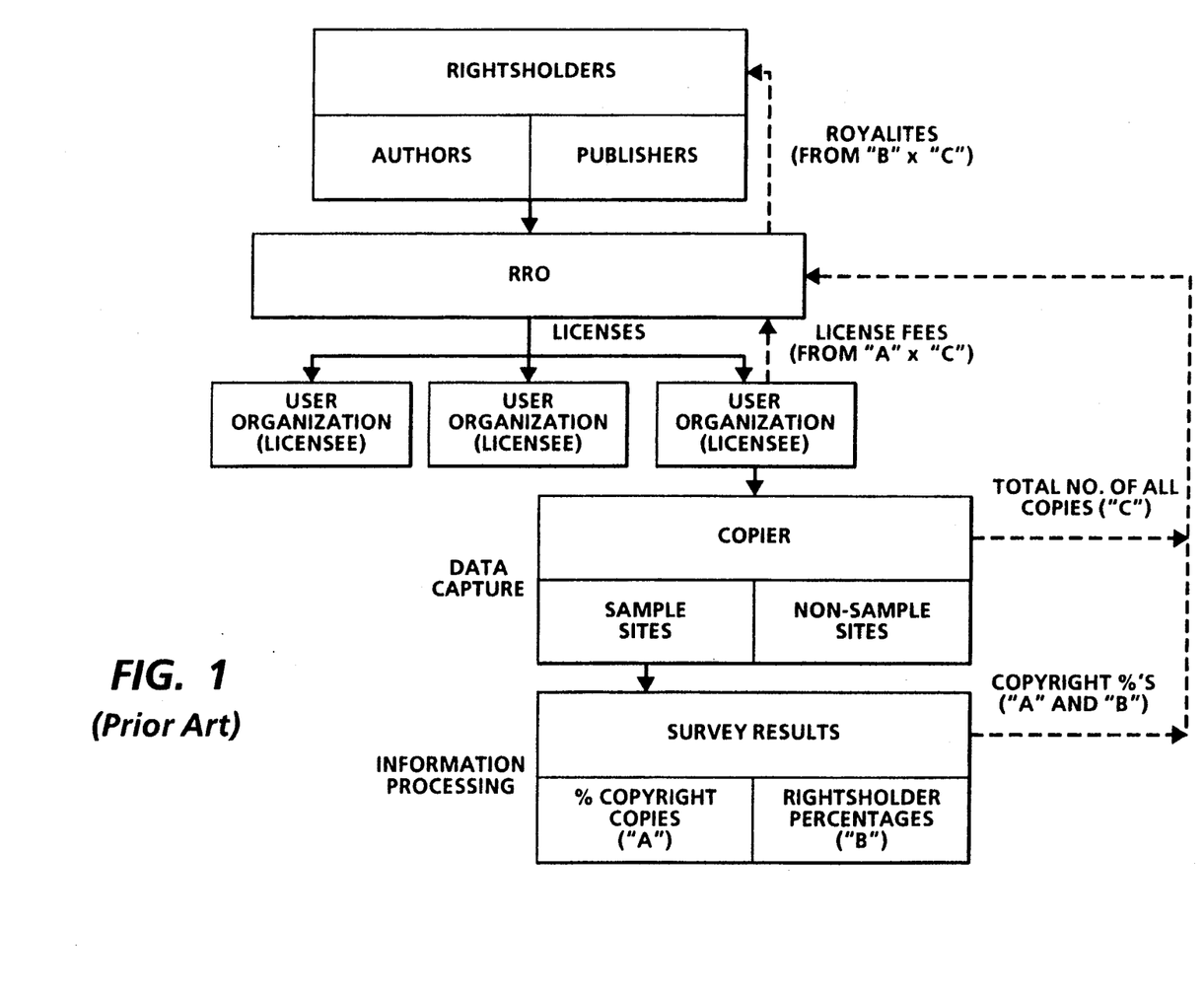
FIG. 1 illustrates a commonly used system for tracking copyrighted information.

In addition to the determination of copyright percentage, many RRO's track information regarding the bibliographic source and/or content of reproduced copyrighted material, e.g., title, author, publisher, type of work (prose, poetry or music, percentage which is photography etc.), from the sampled data, so that individual authors and publishers, or their organizations, can receive proper royalty payments for their works. The published works that are being copied are constantly changing, thus samplings must be repeated on an ongoing basis to ensure that appropriate authors and publishers are identified. FIG. 1 illustrates one such typical copyright compliance system. Further description of the various systems and licensing plans employed by the Copyright Clearance Center are found in an advertising brochure entitled *Creating Copyright Solutions,* distributed by the Copyright Clearance Center, Salem, Mass., the relevant portions of which are hereby incorporated by reference.

Heretofore, manual sampling techniques have been used to collect sample data on copyright copying. Unfortunately, the sampling procedure is cumbersome. The techniques typically require the copier user to complete a detailed form, or to make an extra copy of the whole copy job together with a notation of the number of copies made. A recent system available from ALL-DATA Abrechnungs- und Sicherheitssysteme Gmbh of Villengen, Germany, automatically keeps track of the number of copies made in a copy job, but still requires the copier user to enter, via keyboard, an ISBN/ISSN number (the standard international book and serial numbering systems), or to input it using a manual bar-code "wand" if such a code is available on the document. The need for such cumbersome techniques has had a significant impact on the time needed to enter the information, the accuracy of the sampling performed, and the completeness of the information regarding the authors and publishers. Accordingly, the RRO's, authors and publishers commonly receive less than optimal reporting, and income, for the reproduction of copyrighted works. Further, the difficulty of the sampling techniques discourages user organizations from executing licenses with the RRO's, thus greatly reducing the RRO's potential income. If the samplings capture incomplete author and publisher information, the authors and publishers do not receive fair individual recompense; bar-codes, for example, (even if available) typically only refer to the whole publication, like the underlying ISBN/ISSN, and do not identify the authors of individual articles. Finally, with systems of the ALL-DATA type, it is difficult to categorize the nature of the content of the reprographic job (such as prose versus poetry versus music, or the proportion of photographic material), as required by some RRO's, again since most bar-code schemes only identify an entire publication or are limited to numerical classifications.

The following disclosures may also be relevant:

U.S. Pat. No. 4,173,408, Patentee: Stewart, Issued: Nov. 6, 1979;

U.S. Pat. No. 4,179,212, Patentee: Lahr, Issued: Dec. 18, 1979;

U.S. Pat. No. 4,728,984, Patentee: Daniele, Issued: Mar. 1, 1988;

U.S. Pat. No. 4,786,940, Patentee: Daniele, Issued: Nov. 22, 1988;

U.S. Pat. No. 4,908,873, Patentee: Philibert et al., Issued: Mar. 13, 1990;

U.S. Pat. No. 4,977,594, Patentee: Shear, Issued: Dec. 11, 1990.

The relevant portions of the foregoing patents may be briefly summarized as follows:

U.S. Pat. No. 4,173,408 to Stewart, assigned to Xerox Corporation, discloses a transaction accounting system for the automated royalty accounting of copyright-coded microfiche documents. The complete automated transaction accounting system includes a microfiche copier and a copier access control system including a transaction data terminal for input of transaction information such as the date of the transaction, coded copyright information such as information contained in the ISSN/ISBN number, user identification and number of copies to be produced. A decoder is provided, the output of the decoder being connected to the transaction data terminal to input the document data. In accordance with this accounting system, a microfiche document being copied must be initially coded, with an optical bar-code, in order for the system to recognize the document as being copyrighted via a wand code reader. The copier itself is provided with a suitable decoder in order to identify the copyright-coded document by the bar-code. Information about the bibliographic source of the document (such as the ISBN/ISSN number) is either coded into the bar-code on the microfiche document, or must be input by the user, either by wand scanning or by keyboard entry. The system may further include a data terminal having a data transmission sequence mode to allow the communication of transaction data with a royalty accounting system.

U.S. Pat. No. 4,179,212 to Lahr, assigned to Xerox Corporation, discloses a transaction accounting system for the automated royalty accounting of optically transparent copyright-coded paper documents. The complete automated transaction accounting system includes a document copier and a copier access control system including a transaction data terminal for input of transaction information such as the date of the transaction, coded copyright information such as information contained in the ISSN/ISBN number, user identification and number of copies to be produced. A decoder is provided, the output of the decoder being connected to the transaction data terminal to input the document data. In accordance with this accounting system, a document being copied must be initially coded, at the time the paper is manufactured or printed, by application of special electrically conductive coatings to one or more areas of its surface, in order for the system to recognize the document as being copyrighted. Further, the copier itself has to be provided with a suitable decoder in order to identify the copyright-coded document. Information about the bibliographic source of the document (such as the ISBN/ISSN number) is either coded into the document, or must be input by the user, either by scanning a special bar-code imprinted on the document or by keyboard entry.

The Lahr system cannot be used with any document which does not have the special conductive coating, so it is not applicable to the great majority of published and copyrighted documents. Moreover, the system cannot reproduce the electrically conductive coating on the copy, so that subsequent reproductions would not be detected. The system would be difficult to use with a plurality of different reprographic devices, since it requires a special document platen to sense the paper conductivity; this would make it difficult to economically install such a device on existing reprographic devices. Further, the system is very manual in nature, unless a bar-code is applied to the surface of the document in addition to the electrically conductive coating. Finally, it is very difficult to identify the author of a particular copied portion of a publication, such as a magazine article, or to categorize the nature of the content of the portion (such as prose versus poetry versus music, or the proportion of photographic material), since most bar-code schemes only identify an entire publication.

U.S. Pat. No. 4,728,984 and U.S. Pat. No. 4,786,940 to Daniele, both assigned to Xerox Corporation, disclose data handling and archiving systems. The systems first transfer a document image into digital signals and then store the image in memory for later retrieval. An electronic printer having an image input scanner is used for scanning the documents. The printer is equipped with a recognition circuit that reads a bar or other code on the document to distinguish encoded documents from other non-coded documents. More specifically, the encoded documents may be encoded in a dense digital form so as to contain significant amounts of binary data. Furthermore, the data may be in an encrypted format requiring knowledge of an encryption key to be decoded. The system does not track the copying of certain documents but rather reads the special coded digital images previously placed on the input document, decodes said images and either prints a message based on their content or uses their content as auxiliary software to control the operation of the printer.

U.S. Pat. No. 4,908,873 describes a system for selectively effecting the operation of a copying or facsimile machine in accordance with the textual content of a scanned document. As a copying security system, the invention reads a portion of the text of the document and correlates the text to a predetermined code. The copier or facsimile machine is inhibited or enabled in accordance with the results of the correlation. A microprocessor, in conjunction with an optical code reader, can be programmed to recognize the presence of copyright notices on the documents being copied, so as to inhibit copying until the requisite amount of money is deposited.

U.S. Pat. No. 4,977,594 discloses a digital database usage metering, billing and security system. A decrypting device is employed to allow access to the database and to measure the quantity of information encrypted in the database. The device also communicates to a remote centralized billing facility to report the usage of the database so as to enable charging a user for such access.

The Xerox Disclosure Journal, Vol. 4, No. 1 (Jan.-/Feb. 1979) publication by Hickey describes a copyright accounting system wherein the information necessary for establishing a copyright royalty is contained on an index-type card or bar-code associated with each book or periodical maintained in a library. Prior to copying, a user must provide the card or scan the barcode, and subsequently the information obtained from the card or bar-code would be stored along with the number of copies made.

Unfortunately, the aforedescribed systems often require operator intervention so as to accurately sample the copying. On the other hand, where the pertinent information is incorporated in a discernible mark on the document, recognition of the information may be avoided by covering-up the recognizable identification-/information thereon. The present invention, on the other hand, is directed toward a method and apparatus for overcoming these existing drawbacks of document tracking and copyright sampling or accounting systems.

In accordance with the present invention, there is provided a system to account for copyright royalties accrued as a result of printing a copyrighted document on a document printer, including: a digitized representation of the copyrighted document having a printable code on each page thereof, said representation being provided for reproduction by the document printer; means for detecting the presence of the printable code in said digitized representation of the copyrighted document; means for decoding the printable code; means, responsive to said decoding means, for determining a copyright royalty due for reproduction of the copyrighted document; and accounting means for recording the copyright royalty due.

In accordance with another aspect of the present invention, there is provided an apparatus, associated with a reprographic device, for tracking the reproduction of at least a portion of a copyrighted document having a visible glyph code on each page thereof, said apparatus comprising: means for scanning the visible glyph code contained on at least a portion of a document page being reproduced by said reprographic device and generating a plurality of digital signals representative thereof; memory for storing the digital signals generated by said digital scanning means; and means for decoding the visible glyph code represented by the stored digital signals so as to determine if a copyright royalty is associated with the reproduced page.

In accordance with yet another aspect of the present invention, there is provided an apparatus to prevent the unauthorized reproduction of copyrighted materials on a document printer, including: an original document, input for reproduction by the document printer, said original document having a printable glyph code on each page thereof; means for sensing the presence of the printable glyph code on at least one page of said original document; means for decoding the printable code; means, responsive to said decoding means, for determining that the document is copyrighted; and means for disabling the reproduction of the document upon a determination that the document is copyrighted.

In accordance with yet another aspect of the present invention, there is provided a method of assuring payment of copyright royalties accrued as a result of printing a copyrighted document on a document printer, including: scanning at least a portion of the copyrighted document to produce a digitized representation thereof, said copyrighted document having a printable code on each page thereof; detecting the presence of the printable code in the digitized representation of the scanned portion of the copyrighted document; decoding the printable code; and determining, from said decoding step, if a copyright royalty is required for reproduction of the copyrighted document.

The present invention will be described in connection with a preferred embodiment, however, it will be understood that there is no intent to limit the invention to the various embodiments described. On the contrary, the intent is to cover all alternatives, modifications, and equivalents as may be included within the spirit and scope of the invention as defined by the appended claims.

DESCRIPTION OF THE PREFERRED EMBODIMENT

Figure 2:
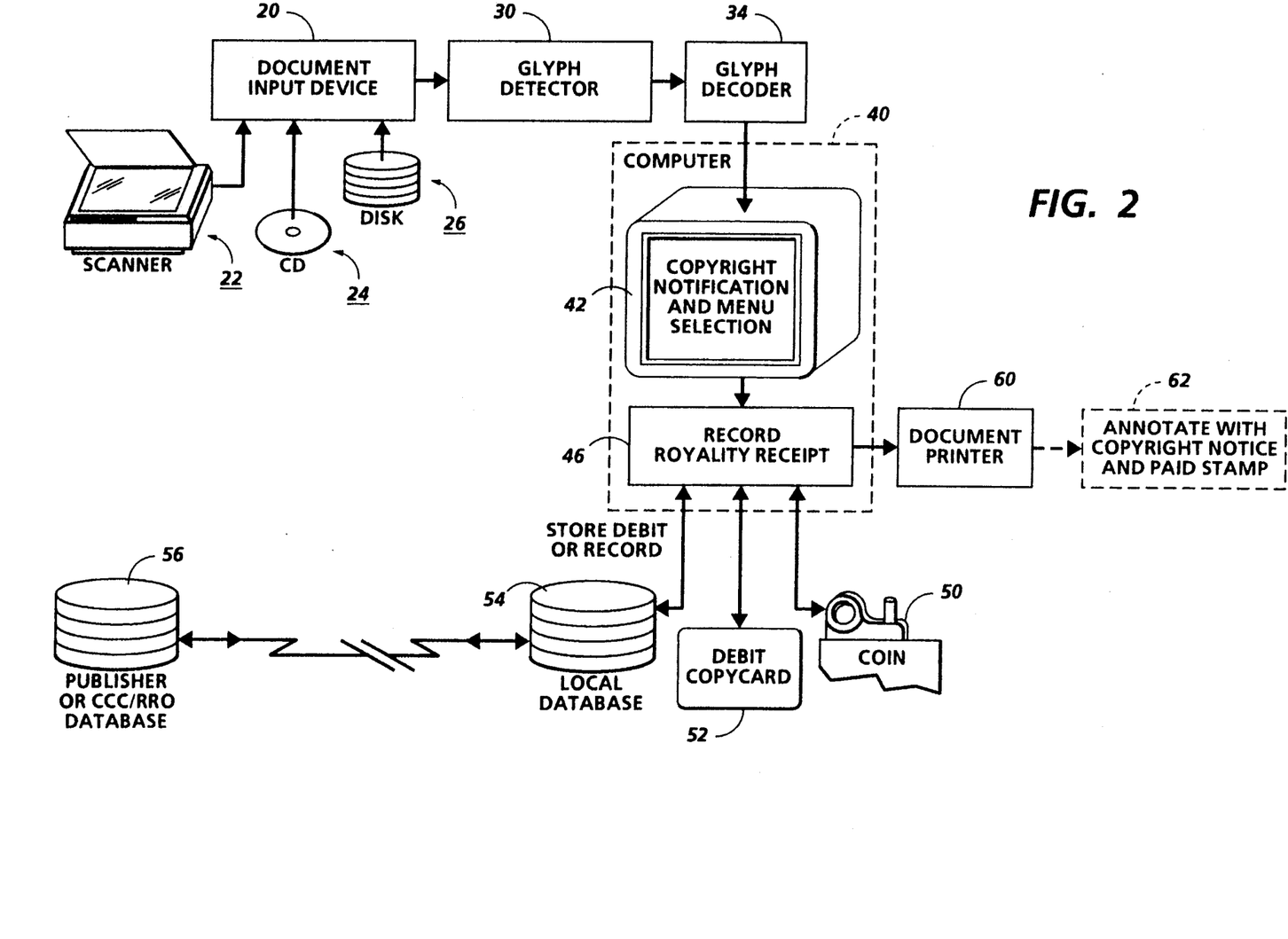
FIG. 2 is a schematic diagram of the architecture for a copyright royalty accounting system in accordance with the present invention.

For a general understanding of the present invention, reference is made to the drawings. In the drawings, like reference numerals have been used throughout to designate identical elements. FIG. 2 shows a possible architecture of the electronic copyright royalty accounting system. The apparatus depicted includes a number of primary components which will be described in detail. First, the apparatus includes a document input device 20 which may include one or more of the following well-known devices: a digital image scanner 22 (e.g., a flat bed scanner or a facsimile device), a disk reader 24 having a digital representation of a document on removable media (CD, floppy disk, rigid disk, tape, etc.) therein, or a hard disk 26 having one or more document images recorded thereon. Generally, the apparatus is intended to work with any device suitable for printing or storing a digitized representation of a document. Moreover, because the present invention may also be adapted for use with a light-lens reprographic machine, input device 20 may also be a scanning array or bar positioned so as to scan an output sheet or similarly developed image being output from the machine (see FIG. 6). Alternatively, the scanning array bar may be positioned with a document handler on a reprographic machine so as to scan a portion of an input document being advanced to the imaging platen thereof (not shown).

Once the document has been represented in a digitized form, glyph detector 30 is employed to determine if the digitized document contains any encoded copyright data. As described in the copending and commonly assigned United States Patent Applications of: Dan S. Bloomberg et al., which was filed Jul. 31, 1990 under Ser. No. 07/560,514 on "Self-Clocking Glyph Codes"; Xiao Bei Zhang, which was filed Dec. 27, 1991 under Ser. No. 07/814,841 (now U.S. Pat. No. 5,245,165) on "Self-Clocking Glyph Codes for Encoding Dual Bit Digital Values Robustly"; and David L. Hecht et al., which was filed Dec. 27, 1991 under Ser. No. 07/814,842 on "Self-Clocking Glyph Code Having Composite Glyphs for Distributively Encoding Multi-Bit Digital Values"; all of which are hereby incorporated by reference for their teachings, data may be represented on a document in an unobtrusive manner using multi-bit binary data symbols encoded in a two-dimensional code therein. More specifically, a self-clocking glyph code faithfully preserves the logical ordering of the bits that are encoded in its glyphs because the glyphs are written onto and read from a suitable recording medium in a known order and in compliance with a predetermined spatial formatting rule. Furthermore, such a code also provides the sample clock that is needed for decoding it because every bit that is encoded by the code is explicitly represented by a glyph, either alone in the case of a single bit per glyph code or in combination with one or more additional bits in the case of a multiple bit per glyph code.

Figure 4:
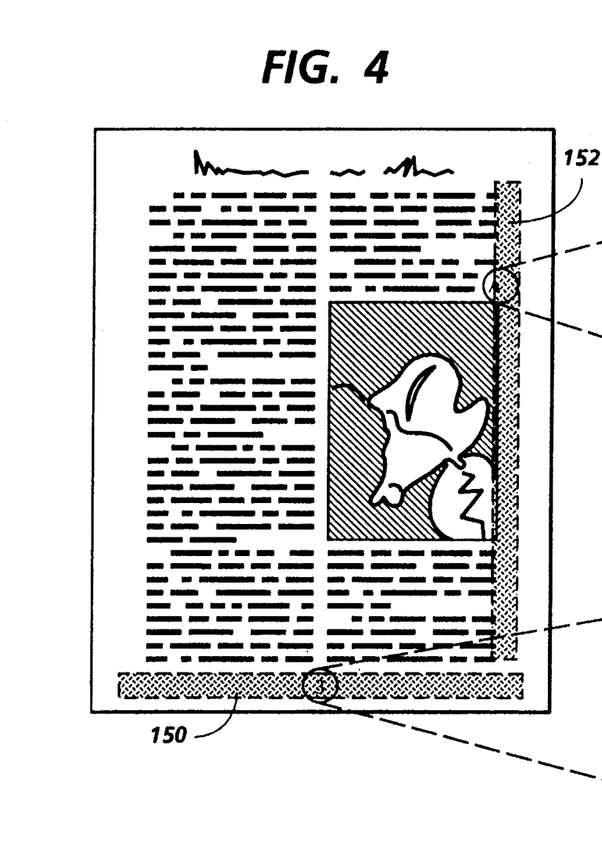
FIG. 4 is an illustration of a document sheet containing the two-dimensional glyph code employed in the present invention.

In the embodiment depicted in FIG. 4, a two-dimensional code would be located in a predefined position on a document sheet, for example, along the bottom of a page as shown by region 150 or along the side margin as shown by region 152. As further illustrated by the enlarged document sections of FIGS. 5 and 6, the encoded portions of regions 150 and 152, respectively, are distinguishable from the adjacent readable information on the document. In such a case glyph detector 30 may be a commonly known image processing device capable of "windowing" the predefined portion of the digitized document. Alternatively, the two-dimensional code may be placed at other less conspicuous locations and could be detected by an image processing device employing a two dimensional spatial filter, such as a notch or multiple notch filter tuned to very specific frequencies. These two-dimensional codes will faithfully reproduce and be detectable in multiple generations of copies. For example, the two-dimensional code information could be placed as a background behind the text of the document or within the margins of the original document. In all cases, the glyph code within regions 150 or 152 would be detectable by glyph detector 30 during reproduction of the document.

Figure 5:
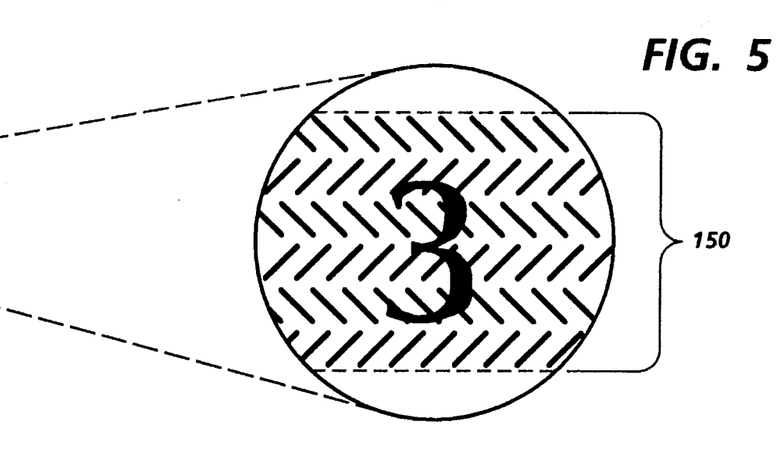
FIGS. 5 and 6 are enlarged representations of the glyph markings appearing on portions of the document sheet in FIG. 4.
Figure 6:
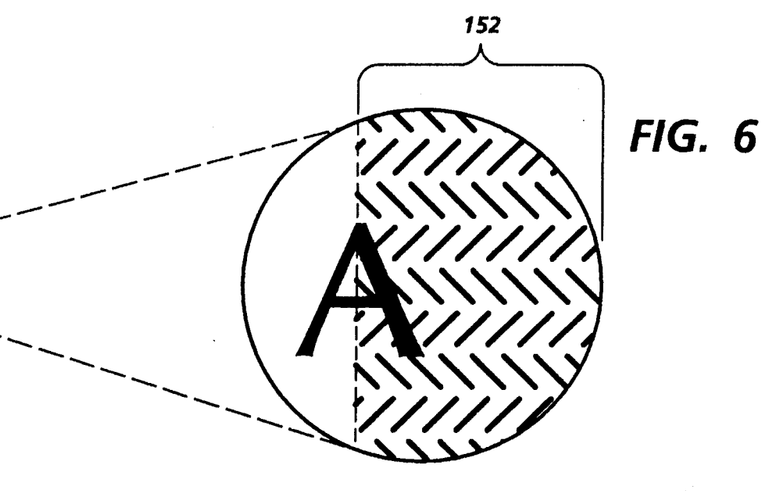

An important characteristic of the two-dimensional or self-clocking glyph code, illustrated in enlarged form in FIGS. 5 and 6, is that it is not readily discernible to the person attempting to make an unauthorized copy and, therefore, is less likely to be defeated by covering up the two-dimensional coded information. However, using image processing techniques, the automatic recognition of the glyph code in a digital representation of the image is possible. The glyph codes can be placed in many positions on the page simultaneously, for example, in graphic lines along the side margins, at the top or bottom of the page, or in any gray/halftone areas. Furthermore, glyph codes that run along the margins of a page can be used to identify the copying of specific lines, as may be important in the reproduction of valuable poetry, plays or music. Glyph codes placed as borders around photos, illustrations, or graphics can also enable separate identification of the owners of photographs, as these are often different from the owner of the book copyright.

In yet another alternative embodiment, the glyph codes may be used to prevent copying of portions of a document as well. As indicated above, individual portions of a document may be delimited by the surrounding or adjacent glyph code. Such a code may bear the information that, upon being interpreted by a reprographic system, would crop the delimited portion and prevent its reproduction on the output document.

Figure 3:
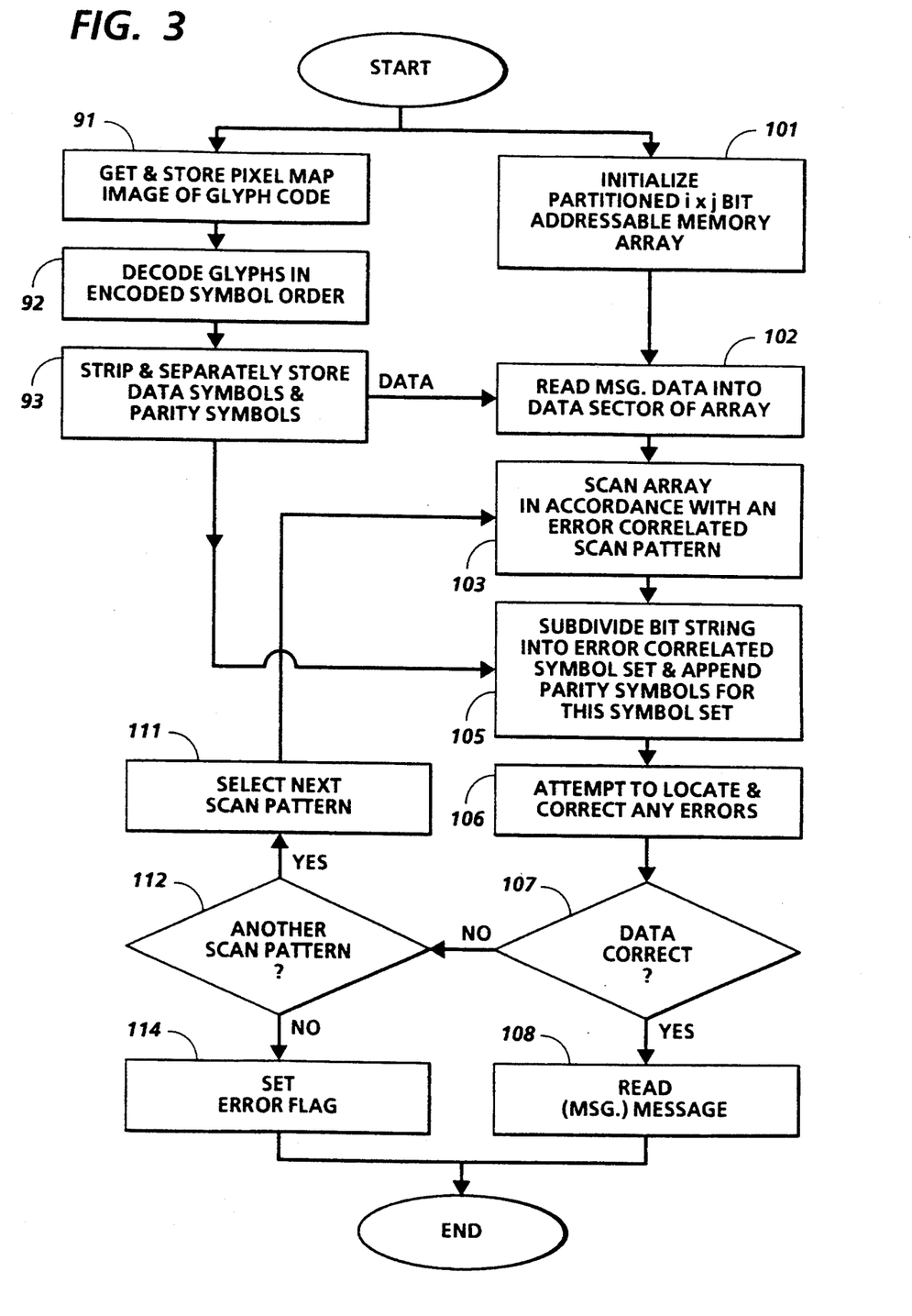
FIG. 3 is a flow chart illustrating a process for reading a glyph code present in a digitized representation of a document.

Referring also to the flowchart of FIG. 3, having obtained and stored the pixel map image of the glyph code into memory at 91, such as by input scanner 22 in FIG. 2, the decode values for the individual glyphs are then determined at 92 by glyph decoder 34. The locations of the data bytes and parity symbols in the glyph code are known from glyph detector 30, so that information is used at 93 for separating the decode values for those different symbol sets from each other, thereby enabling the decode values for the respective symbol sets to be stored at independently addressable memory locations.

For correcting correctable decode errors, the memory array initialization, data transfer and scan steps at 101,102 and 103, respectively, are described by David L. Hecht, in an application filed Mar. 20, 1992 under Ser. No. 07/856,002 on "Logically Independent Subarray Tilings of Glyph Codes for Reduced Hard Error Susceptibility," incorporated herein by reference. Each scan 103 produces a string of symbols that are correlated with a respective one of the anticipated burst error patterns, so the parity symbols for that particular error pattern are appended or otherwise associated with the symbol string at 105 in preparation for correcting errors that might exist. If, the error correction process 106 returns correct data, as determined at 107, the data bytes are read at 108 to reconstruct the encoded copyright message information. On the other hand, if it is found at 107 that the decode errors are not susceptible to correction, the process may be repeated, as at 111, using the next scan pattern. If decode errors still exist after all of the scan patterns have been tried, as determined at 112, an error flag is suitably set at 114 prior to terminating the process. The error flag may be interrogated so as to enable copying without recording copyright information, or to inhibit copying based upon an assumption that the document is copyrighted.

Once the glyph code is successfully decoded into a digital data format representing a plurality of alphanumeric characters, for example any well-known information interchange code, the data represented therein may be parsed to determine copyright and related information for the original document. More specifically, the digital information could be a representation of ASCII data which would then be parsed to determine one or more of the following: a) an indication of a copyright for the document; b) an identification number for the document (i.e., ISBN, ISSN, etc.); c) an indication of the publisher and/or author of the document and an electronic address or equivalent indication of information necessary to properly transfer funds or notify the copyright holder; and d) the copyright royalty due as a result of copying the all or portions of the document, including any discounts applicable for multiple reproductions.

Having decoded the glyph and parsed the information represented therein, a general purpose microprocessor-based computer 40 may be used to perform one of a number of transaction or recording events. In the simplest form, computer 40 would, via information display 42, provide a visual indication to an operator that the document was subject to copyright protection. The computer, being interfaced to the printing system, could then prevent subsequent printing of the document until an indication of copyright royalty receipt was present, for example, as indicated by royalty receipt recording device 46 in FIG. 2. Such an indication might be provided by a signal from either of the commonly known coin slot 50 or copy card 52 type systems presently found on many convenience copiers in libraries and other public areas.

Alternatively, more advanced reprographic and printing systems could employ an accounting or database type system 54 to track the accrual of copyright royalties, or merely the number of copies made of copyrighted documents. As yet another option, local database 54 could periodically transmit or upload the copyright royalty information to the databases of individual publishers or an RRO as represented by database 56.

Once the copyright royalty information and or payment is accounted for by copyright royalty recording means 46, computer 40 enables the operation of document printer 60 to reproduce the document as specified by the operator. In one embodiment, the printer may be able to reprint the glyph code in the location in which it was sensed by glyph detector 30. In a simple form, reprinting the glyph would be accomplished during the normal reproduction of the document. However, in a printer which reproduces the document from a digital image representing the original document, the glyph could be reprinted on the document without any of the degradation commonly found in documents reproduced from prior reproductions (e.g., multi-generation copies). More specifically, the portion of the document containing the glyph information, assuming it was separable from the content portion of the document, would not be reproduced from the digitized input obtained from the original document. Rather, the glyph portion could be printed anew in response to a re-coding of the decoded glyph information. In this way, the glyph portion of the image would avoid the degradation associated with digitization and subsequent reproduction. Moreover, new information could also be added in this manner. For example, an indication of what generation the copy is, where and when the original copy was made could be added to the document to enable an audit of the system. Also, if available, an identifying number or code representing the individual and/or document printer could be annotated as a glyph code on the document.

As represented in FIG. 2 by the annotation device 62, printer 60 may also contain the capability to accomplish one or more annotation operations on the reproduced document. In one embodiment, the annotation could be in the form of a copyright notice reproduced on the copy. Alternatively, the annotation device could be used to mark the document with an indication that a copyright royalty had been accrued/paid for the reproduction of the document. Such a device might accomplish the annotation using an alternate or highlight color marking ink, or by placing a mark along a border of the reproduced document.

Figure 7:
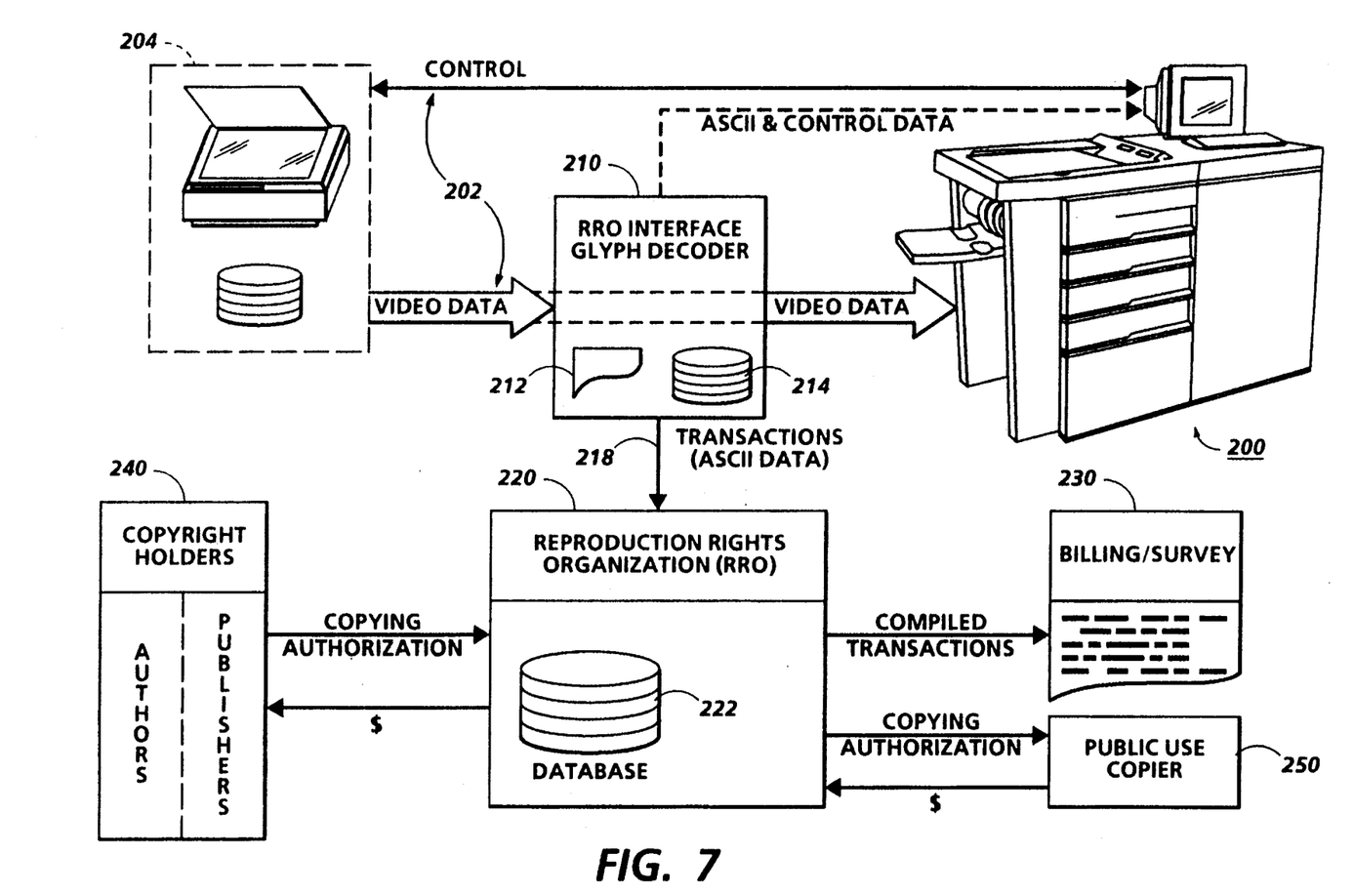
FIG. 7 is an elevational view of a digital printer embodiment incorporating the present invention.

Turning now to FIG. 7, the present invention will be particularly described with respect to an electronic printing embodiment. As illustrated, the electronic printing system is comprised of a printer 200, a network 202 and an image source 204. In normal operation, printer 200 is in communication with image source 204 which may be any scanning, digitizing or page composition workstation capable of providing a digitized representation of a document to be printed. While it is conceivable that image source 204 is an image scanner directly associated with printer 200 as, for example, in the Xerox® Docutech® Production Publisher, the printer may also be a work group printer attached to a network as illustrated. Residing, on the network or within the hardware of the printer at a location suitable for monitoring bit-map image data sent to printer 200, is RRO Interface 210. Similar to the computer of FIG. 2, the purpose of the RRO Interface is to monitor the image data sent to be printed in order to detect the presence of digitized glyph codes within the bit-map image which indicate that the document being sent for printing is subject to a copyright. An important aspect of RRO Interface 210 is that it operates in a manner which is "transparent" to those using the printer to produce hardcopy reproductions and therefore unlikely to be avoided or overridden by those seeking to avoid payment of copyright royalties.

As previously described, RRO Interface 210 would first detect, decode, and parse the glyph information. If the glyph information is determined to contain copyright information, the RRO Interface would establish a data structure 212 to represent the document printing request. Such a structure would contain the information necessary to correctly identify the document or portion of a publication being reproduced along with the number of copies to be generated. Once the data structure was competed, in accordance with the requirements of the document printing request, the data structure would reflect a copyright royalty transaction, including the amount of copyright royalty due along with an identification of the copyright holder(s) to whom the royalty is due. In one embodiment, the transaction would be stored on disk or non-volatile memory 214 within RRO Interface 210 and later transmitted as one of a batch of transactions via telephone link 218 or similar method to RRO 220. Alternatively, the RRO Interface could compile the transaction data for each document printing request in Random Access Memory and immediately transmit the data to the RRO via link 218.

Once the transaction data is received by RRO 220, it is stored in database 222. Then, periodically, the RRO will generate compiled lists of the copyright transactions transmitted thereto. Using the compiled lists of transactions, the RRO can produce billing or survey results 230 which establish the copyright royalties accrued as a result of documents being printed on printer 200. Moreover, because the copyright transaction data structure included data identifying specific copyright holders, the RRO may also periodically disperse collected copyright royalties to the copyright holders 240 in return for the copyright holder's authorization for the RRO to manage collection of the royalties. Similarly, the same system could communicate directly with those publisher and authors whose interests are not represented by the RRO.

Figure 8:
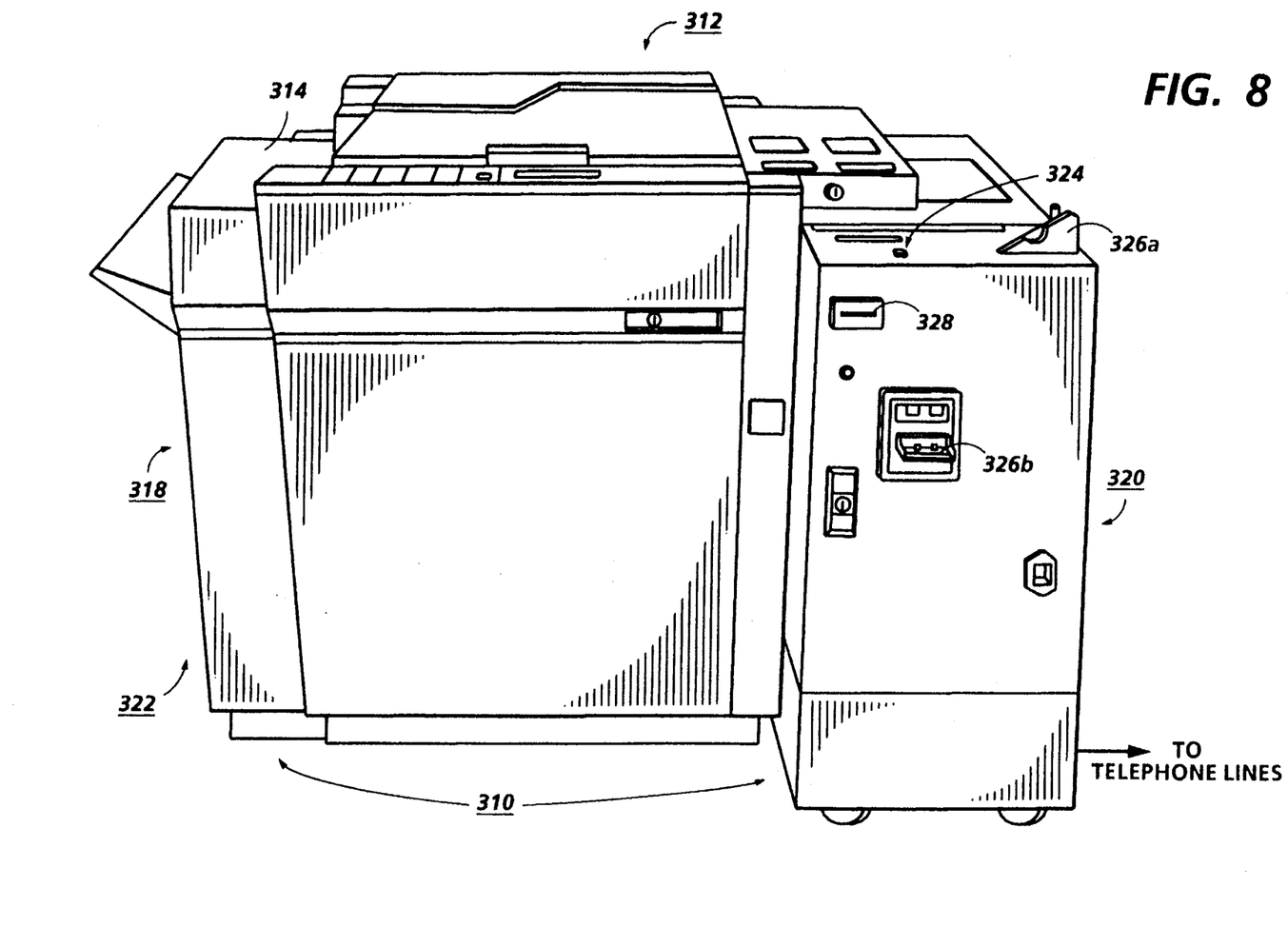
FIG. 8 is an elevational view of a light lens xerographic copier embodiment incorporating the present invention.

Referring now to FIG. 8, an apparatus 310 for tracking reproduction of copyrighted information, or of other information whose reproduction should be controlled, limited or tracked, is illustrated in conjunction with a light-lens reprographic machine 312. Tracking apparatus 310 is detachably connected to a reprographic device 312 in a manner which does not significantly impact the reprographic device. Tracking apparatus 310 has a structure enabling it to be attached to a number of reprographic devices with minor adaptations, such as height and mounting means. Tracking apparatus 310 includes a digitizer section 314, memory 318 for storing the output of digitizer 314, and a controller 320. Digitizer 314 and recorder 318 are preferably compactly contained within tower 322. In order to render it more easily attachable to a variety of reprographic devices, tower 322 may be of adjustable height and may have cut-outs and the like to allow positioning in close proximity to various models of reprographic device 312, despite protrusions extending therefrom. Digitizer 314 scans a reproduced document page output from reprographic device 312 to create a digitized bit-mapped image of the copyrighted material. Specifically, the reproduced document page would be a page containing an identifying glyph code bearing the encoded copyright information as illustrated in FIGS. 4, 5 and 6. Digitizer 314 can utilize an integrated contact image sensor of the type commonly used in facsimile machines. Such an image sensor typically comprises an illumination source, a lens array and an image detector, in one integrated package; said contact image sensor being placed in close proximity to the page being digitized as it exits reprographic machine 312.

Digitizer 314 is preferably attached, as part of tower 322, between the main portion of reprographic device 312 and the paper output portion (by which is meant the output tray, sorter, stapler, etc.) of reprographic device 312. Further details of the adaptation of digitizer 314 with respect to tower 322 and reprographic machine 312 are described by Vincett et al. in application Ser. No. 07/790,309 for "Tracking the Reproduction of Documents on a Reprographic Device," the relevant portions thereof being hereby incorporated by reference. As described therein, digitizer 314 also includes rollers and/or guides to guide paper through the digitizer portion of tracking apparatus 310. If the digitizing sensor is in a main paper path, it may be retractable as necessary to permit passage of stapled sets of pages or of thick paper.

Alternatively, since the time required for digitization (which is limited by the speed of the digitizing sensor, such as a contact image sensor) may require each digitized page to be slowed down compared with the speed of reprographic device 312, a deflection of the reproduced document page can be performed by tracking apparatus 310 prior to digitization. After such deflection, each page may be digitized almost immediately, or several pages may be diverted to a separate tray for later digitization; the latter approach prevents the need for any significant delay between output by the main portion of reprographic device 312 of successive pages to be digitized.

Once digitized, an image of each reproduced document page can be stored temporarily in a Random Access Memory or similar storage device 318 in the same transaction data record previously described. Once the digitized document image is recognized as containing a glyph code bearing copyright information, the reproduced document page is inhibited from exiting tower 322. Upon prompting the operator, via a display on control panel 324, further action is precluded until payment of the requisite copyright royalty fee is indicated as described below. Once paid, the transaction data structure is updated with a "paid" indicator and the information is stored for later retrieval or transmission to the RRO as previously described with respect to the system of FIG. 7.

Tracking apparatus 310 is preferably connected to a foreign interface connector (not shown) commonly provided in reprographic device 312. A foreign interface connector enables attachment of third party devices such as coin-operated and auditron (copy counting) accessories. The foreign interface connector communicates with controller 320 by providing a Start Enable/Disable capability for the reprographic device 312 and an electrical pulse for each reproduction made. Controller 320 would use the Start Enable/Disable capability to control (by providing or failing to provide appropriate signals to said connector) the reprographic device so as to inhibit the output of the reproduced document page and prevent further copying of the original document until the appropriate royalty payment is obtained. In the embodiment depicted in FIG. 8, an operator may deposit the required copyright royalty via coin slot 326a, dollar bill slot 326b, or by debiting a copy card or credit card inserted into the card reading receptacle 328. Presumably such a system could also be used as a coin-operated reprographic machine for reproducing non-copyrighted documents.

As a stand-alone or personal-use system, the tracking apparatus would require periodic service to empty the accumulated funds paid for the copyright royalties and/or copying charges. Accordingly, the tracking apparatus could also include communication hardware to establish connections with an external system, similar to that previously described with respect to the RRO in FIG. 7. As illustrated by the telephone link in FIG. 8, communications with an external system would allow the tracking apparatus to transfer the transaction data stored in memory 318 on a periodic basis, thereby enabling the accurate division of funds amongst the proper recipients of the royalties, as illustrated by the personal-use copier block 250 in FIG. 7.

If tracking apparatus 310 is used in conjunction with a reprographic device which digitizes the input document (e.g. an electronic reprographic machine), recorder 318 can be arranged to intercept, detect and decode glyphs within the digitized image already present in reprographic device 312, as represented by the system depicted in FIG. 7. Accordingly, tracking apparatus 310 does not necessarily digitize the image from a page output from reprographic device 312. Rather, tracking apparatus 310 may operate on digital images output from reprographic device 312, or may digitize pages output from said device and then operate on the digital images so produced.

In recapitulation, the present invention is a method and apparatus for utilizing a printable, yet unobtrusive glyph or similar two-dimensional encoding scheme to identify copyrighted documents. Upon attempting to reproduce such a document, the glyph is detected, decoded and used to accurately collect and/or record a copyright royalty for the reproduction of the document. Furthermore, the glyph may also include additional information so as to enable an electronic copyright royalty accounting system capable of interpreting the encoded information to track and/or account for copyright royalties which accrue during reproduction of all or part of the original document.

It is, therefore, apparent that there has been provided, in accordance with the present invention, a method and apparatus for tracking the reproduction of copyrighted documents and accounting for copyright royalties accrued therefrom. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A system to measure and accrue copyright royalties due as a result of printing a copyrighted document on a document printer, including:

a digitized representation of the copyrighted document having a printable code on each page thereof, said representation being provided for reproduction by the document printer;

an image processing device for detecting the presence of the printable code in said digitized representation of the copyrighted document;

a decoder for transforming the printable code into a digital representation of alphanumeric characters;

a parser, responsive to said decoder, for determining whether the alphanumeric characters indicate that a copyright royalty is required for reproduction of the copyrighted document; and accounting means for recording the copyright royalty due.

2. The apparatus of claim 1, further including means for collecting the copyright royalty before printing the copyrighted document.

3. The apparatus of claim 2, further including an information display for prompting an operator and indicating that a copyright royalty payment is due prior to reproduction of the copyrighted document by the document printer.

4. The apparatus of claim 1, further including means for compiling and storing accrued copyright royalties for the printing of copyrighted documents over a period of time.

5. The apparatus of claim 4, further including means for periodically collecting payment of the accrued copyright royalties.

6. The apparatus of claim 4, further including means for generating a list of the accrued copyright royalties.

7. The apparatus of claim 6, wherein the list of accrued copyright royalties are printed by the document printer.

8. The apparatus of claim 6, further including a network, connected between the document printer and a remote host, over which the list of accrued copyright royalties are transferred to the remote host.

9. The apparatus of claim 1, further including:
means for electronically recording, along with the copyright royalty due, an account identifier to which said copyright royalty is to be charged; and
means for effecting a transaction with the identified account to transfer funds at least equal to the copyright royalty due.

10. The apparatus of claim 1, further including means for reproducing the printable code on each reproduction of the original document, wherein the printable code on the reproduced document is detectable by the apparatus during a subsequent reproduction operation.

11. The apparatus of claim 10, further including marking means for automatically placing indicia on each reproduction of the copyrighted document to indicate that the copyright royalty has been accrued for the reproduced document, thereby designating the reproduction as an authorized reproduction of the copyrighted document.

12. The apparatus of claim 11, wherein said marking means automatically places encoded indicia on each reproduction of the copyrighted document representing additional information from the group consisting of:
a time that the reproduction was made;
a location where the reproduction was made;
an individual who made the reproduction; and
a machine identifier indicating the document printer on which the reproduction was made.

13. The apparatus of claim 1, wherein said decoder comprises:
first parsing means for parsing the decoded data to determine the copyright royalty; and
second parsing means for parsing the decoded data to determine additional information from the group consisting of:
author,
publisher,
ISBN number,
ISSN number, and
electronic address of a copyright holder.

14. The apparatus of claim 13, wherein said first parsing means is capable of determining which pages, lines, photographs and illustrations are being copied from said copyrighted document, and to determine the copyright royalty as a function thereof.

15. The apparatus of claim 1, wherein said printable code is a two-dimensional, self-clocking code.

16. The apparatus of claim 15, wherein said printable code is visible on said copyrighted document, yet is not discernible as one containing copyright information.

17. An apparatus, associated with a reprographic device, for tracking the reproduction of at least a portion of a copyrighted document having a visible self-clocking glyph code on each page thereof, said apparatus comprising:
a scanning mechanism for scanning the visible self-clocking glyph code contained on at least a portion of a document page being reproduced by said reprographic device and generating a plurality of digital signals representative thereof;
memory for storing the digital signals generated by said digital scanning means; and
a decoder for decoding digital signals representative of the visible self-clocking glyph code within the stored digital signals to determine if a copyright royalty is associated with the reproduced page.

18. The apparatus of claim 17, wherein said decoder further decodes the visible self-clocking glyph code to obtain an identifier for the copyright holder, and where the apparatus further comprises:
a counter to count the total number of reproductions of the portion of the copyrighted page produced by the reprographic device; and
means for recording the total number in association with the identifier.

19. The apparatus of claim 17, wherein said visible self clocking glyph code is a two-dimensional, self-clocking code.

20. The apparatus of claim 19, wherein said visible self clocking glyph code is not discernible as containing copyright information.

21. The apparatus of claim 20, wherein said two-dimensional code is reproducible by the reprographic device so that a reproduction of the two-dimensional code is detectable during a subsequent reproduction thereof.

22. The apparatus of claim 17, further comprising:
means, connected to the reprographic device, for receiving a payment of funds and indicating an amount received;
means for inhibiting the availability of a reproduction of the copyrighted document page until said payment receiving means indicates that the funds received are equal to or greater than the copyright royalty associated with the copyrighted document page.

23. The apparatus of claim 17, further comprising:
means for reporting the payment of funds to enable at least a portion of said funds to be paid to a holder of the the document copyright.

24. The apparatus of claim 17, wherein the visible self clocking glyph code further delimits a portion of the copyrighted document.

25. The apparatus of claim 24, wherein the visible self clocking glyph code delimiting the portion of the copyrighted document further identifies a holder of the copyright for the delimited portion thereof.

26. The apparatus of claim 24, wherein the visible self clocking glyph code delimiting the portion of the copyrighted document further identifies that portion of the document as one which is to be cropped during reproduction by the reprographic device.

27. The apparatus of claim 17, wherein the visible self clocking glyph code further designates a portion of the copyrighted document, and where said portion is:
   a line of text,
   a quotation,
   a photograph, or
   an illustration.

28. An apparatus to prevent the unauthorized reproduction of copyrighted materials on a document printer, including:
   an original document, input for reproduction by the document printer, said original document having a printable self-clocking glyph code on each page thereof;
   means for sensing the presence of the printable self-clocking glyph code on at least one page of said original document;
   means for decoding the printable self-clocking glyph code;
   means, responsive to said decoding means, for determining that the document is copyrighted; and
   means for disabling the document printer, thereby preventing the reproduction of the document upon a determination that the document is copyrighted.

29. The apparatus of claim 28, further including a user interface to indicate to an operator of the reprographic machine that said original document input for reproduction is subject to a copyright royalty.

30. The apparatus of claim 28, wherein said printable self clocking glyph code is a two-dimensional, self-clocking code.

31. The apparatus of claim 30, wherein said printable self clocking glyph code is not discernible as containing copyright information.

32. A method of detecting a requirement for payment of copyright royalties as a result of printing a copyrighted document on a document printer, including:
   scanning at least a portion of the copyrighted document to produce a digitized representation thereof, said copyrighted document having a printable self-clocking glyph code on each page thereof;
   detecting the presence of the printable self-clocking glyph code in the digitized representation of the scanned portion of the copyrighted document;
   decoding the printable self-clocking glyph code; and
   determining, from said decoding step, if a copyright royalty is required for reproduction of the copyrighted document.

33. The method of claim 32, further including the step of collecting the copyright royalty before printing the reproduction of the copyrighted document.

34. The method of claim 33, further including the step of prompting an operator of the document printer to indicate that a copyright royalty payment is due.

35. The method of claim 32, further including the step of inhibiting the availability of the reproduction of the copyrighted document until the required copyright royalty is collected.

36. The method of claim 32, further including the step of storing, in memory, a record of copyright royalties accrued for the printing of copyrighted documents over a period of time.

37. The method of claim 36, further including the step of generating a list of the accrued copyright royalties.

38. The method of claim 36, wherein said storing step further storing, along with the copyright royalty due, an account identifier to which said copyright royalty is to be charged.

39. The method of claim 32, further including the step of reproducing the printable code on each reproduction of the original document, wherein the printable code on the reproduced document is detectable during a subsequent printing operation.

40. The method of claim 39, further including the step of placing indicia on each reproduction of the copyrighted document to indicate that the required copyright royalty has been paid.

41. The method of claim 32, wherein said decoding step comprises parsing the decoded data to determine the copyright royalty.

42. The method of claim 41, wherein said decoding step further comprises parsing the decoded data to determine additional information from the group consisting of:
   the author,
   the publisher,
   the ISBN number,
   the ISSN number, and
   electronic address of a copyright holder.

* * * * *